United States Patent [19]

Horner, Jr.

[11] Patent Number: 5,335,582
[45] Date of Patent: Aug. 9, 1994

[54] VACUUM BRAKE BOOSTER

[75] Inventor: Charles B. Horner, Jr., South Bend, Ind.

[73] Assignee: Allied-Signal Inc., Morristown, N.J.

[21] Appl. No.: 846,844

[22] Filed: Mar. 6, 1992

[51] Int. Cl.⁵ .............................................. F15B 9/10
[52] U.S. Cl. ................... 91/369.3; 92/13.2; 92/13.41
[58] Field of Search ................ 91/369.1, 369.2, 369.3, 91/369.4, 376 R; 92/13.2, 13.41, 13.6, 60.5

[56] References Cited

U.S. PATENT DOCUMENTS

| | | | |
|---|---|---|---|
| 4,428,274 | 1/1984 | Takeuchi et al. | 91/376 R |
| 4,846,047 | 7/1989 | Uyama et al. | 91/376 R |
| 5,014,598 | 5/1991 | Champagne | 92/13.6 |
| 5,074,191 | 12/1991 | Meynier | 91/369.2 |

Primary Examiner—Edward K. Look
Assistant Examiner—F. Daniel Lopez
Attorney, Agent, or Firm—Leo H. McCormick, Jr.; Ken C. Decker

[57] ABSTRACT

In a method of manufacturing a brake booster, a step of defining a fixed distance between a peripheral surface on a rear shell of the brake booster and an eye of a linkage member attached to a brake pedal when the movable wall is in a rest position. The wall in the brake booster is adapted to be rotated with respect to a variable surface on the rear shell which acts as a stop for the wall in the rest position. The location of the wall with respect to the variable surface establishes a desired fixed linear dimension between a peripheral surface on the rear shell and an eye on the linkage member which is attached to connecting pin the brake pedal. When the control valve is in the rest position this fixed linear dimension also defines a corresponding fixed location for the pad of the brake pedal with respect to a floor panel in a vehicle.

3 Claims, 3 Drawing Sheets

VACUUM BRAKE BOOSTER

This invention relates to a method of manufacturing a vacuum brake booster wherein a linear space relationship between a peripheral surface on a rear shell and the eye of a linkage member are established by selectively locating a wall member with respect to a stop on the rear shell.

During the manufacture of a vacuum brake booster the component parts are assembled on a production line in a manner such as disclosed in U.S. Pat. No. 4,268,945. After the brake booster is assembled, a bench test is performed to make sure that the operational characteristics thereof are within a standard specification. All brake boosters that fall within this standard are accepted and made available for use in the manufacture of vehicles. It has been noticed that during any given production run by an automobile manufacture, the brake actuation system for each vehicle may have a slightly different feel than that of another vehicle during the same run using similar components. It has been determined that some differences may occur because of variances in the height of the brake pedal on such vehicles. Some of the variances in the height of the brake pedal can occur because of a build up of manufacturing tolerances of the component parts during the manufacture of a brake booster. The build up in tolerances can effect the location of the connecting pin for the input push rod with the brake pedal, as an example a ±0.030 inches in the location of the connecting pin can create a difference of ±0.120 inches between the floor panel and brake pad in a vehicle.

In the present invention, the extension of a valve rod or linkage member from a brake booster is set during the manufacture of the brake booster. The valve rod is carried in a bore of the wall which separates the interior of the brake booster into a front chamber and a rear chamber. A diaphragm located on the wall allows the wall to linearly move while preventing rotation thereof after installation between the front and rear shell. Once installed, the wall engages the rear shell to provide the same valve rod extension after each brake application. By selectively setting the valve rod extension, manufacturing tolerances of the component parts can be nullified and as a result when the brake booster is installed in a vehicle, the brake pedal height should be substantially identical for all similar vehicles. To perform this step of nullification, a rear shell for the brake booster has a stop member with a variable ramp surface such that after the component parts of the booster are installed, a distance between the peripheral surface of the rear shell and eye of the linkage is obtained. This distance is compared with a set distance for a particular vehicle to make sure that eye of the linkage member connection will be in the desired location when installed in a vehicle. Compensation for any differences in the measured distance and the desired distance is achieved by rotating the wall to change the engagement with a variable ramped surface on the rear shell. Once the wall has moved on the ramp and the valve rod or linkage member is correspondingly moved. Thereafter the position of the wall and rear shell is fixed by lancing or locking the diaphragm between the rear shell and the front shell. Implementation of this step in the manufacture of a brake booster would assure that the distance between the peripheral surface on the rear shell and eye of the valve rod or linkage member is substantially identical for each brake booster. Thereafter when such a brake booster is installed in vehicles, the height of a brake pedal should also be identical.

It is an object of this invention to provide a step in the manufacture of a brake booster to define the distance that a valve rod extends from a rear shell.

It is another object of this invention to provide a brake booster with a rear shell having a ramped stop member to selectively choose an engagement location for a wall to compensate for a build up of manufacturing tolerances.

It is a further object of this invention to provide a brake booster with a linkage member whose connecting point with a brake pedal is identical for a class of vehicles to aid in defining the height of a brake pedal with respect to a floor panel.

These objects and other advantages should be apparent from reading the accompanying specification while viewing the drawings wherein;

FIG. 1 is a sectional view of a brake booster made according to the principals of this invention wherein the portion above the center line illustrates a first location of the components within the brake booster and the portion below the center line illustrates a second location of the components within the brake booster, the position for an individual brake booster being established during the manufacture of the brake booster to define a desired extension for the valve rod of that particular brake booster;

Figure 1:
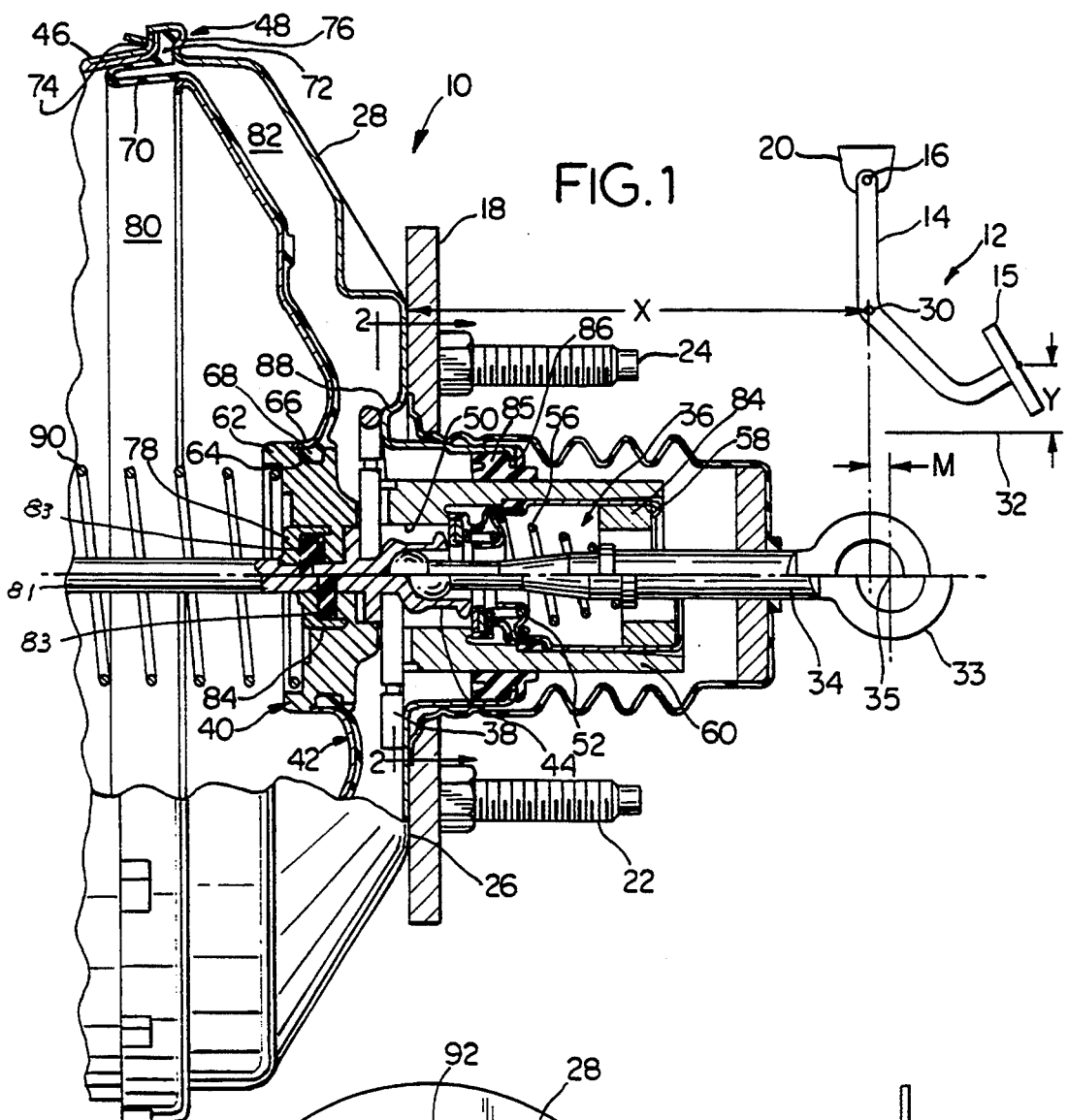

The servomotor or brake booster 10 shown in FIG. 1 is designed to be connected to a master cylinder in a brake system to assist in providing an output force to effect a brake application in response to an input force applied to a brake pedal 12. Brake pedal 12 has an arm 14 which pivots about pin 16 fixed to a bracket 20 attached to the dash panel 18 of a vehicle. When brake booster 10 is secured to the dash panel 18 by a plurality of studs 22 and 24 a distance "x" is established between the peripheral surface 26 on rear shell 28 and pin 30 in arm 14 of the brake pedal 12. Distance "y" between the floor panel 32 and pad 15 on brake pedal 12 is directly proportional to the distance "x" with the brake pedal 12 in the rest position. While distance "x" is primarily dependent on the length of the linkage member or valve rod 34 for the control valve 36, it is also dependent on a build up of manufacturing tolerances of components in the brake booster 10 including the plunger 44, key member 38, and the thickness of the rear shell 28. All of the manufacturing tolerances, which can be additive, contribute to differences in distance "x" between various brake boosters even when the brake boosters are manufactured on the same assembly line and meet output operational specifications. The inclusion of a ramp 88 on the rear shell 28 and a step of measuring the distance "x" during manufacturing a brake booster 10 to selectively define a stop for the wall 42 in brake booster 10 provides a means to compensate for the build up of manufacturing dimensional tolerance such that distance "x" should be substantially identical for each brake booster 10 that is manufactured on an assembly line using similar components.

With the exception of the rear shell 28, brake booster 10 shown in FIG. 1 is identical to the brake booster disclosed in U.S. Pat. No. 4,953,446. Brake booster 10 includes a front shell shell 46 which is connected to the rear shell 28 by a twist lock arrangement 48 to form a unitary structure. The interior of the unitary structure is divided by wall 42 into a front chamber 80 and a rear chamber 82. The wall 42 is located on valve body 40 which has a bore 50 therethrough. The control valve 36 which includes plunger 44 and poppet member 52 is retained in bore 54 by key member 38. Valve return spring 56 is 05 confined between valve rod 34 and retainer 58 to hold poppet member 52 in cylindrical projection 60 of the valve body 40. Valve body 40 has a flange 62 with a groove 64 which retains backing plate 66 and a first bead 68 of diaphragm 70 of wall 42. The first bead 68 resiliently engages the valve body 40 to form a substantially solid joint which prevents rotation there between. A second bead 72 of the diaphragm 70 is located between peripheral surface 74 on front shell 46 and and peripheral surface 76 on rear shell 28. Head 78 on output member 81 is located in groove 84 on the face of the valve body 40 to retain reaction disc 83 adjacent the face of plunger 44.

During the manufacture of brake booster 10, wall 42 is inserted into rear shell 28 with projection 60 extending through seal and bearing 85 in opening 86. A force is applied to flange 62 to bring key 38 into engagement with ramp 88 on the rear shell 28 and simulate the rest position for the wall 42 when the brake booster 10 is installed on a vehicle. A distance x'+m between the peripheral surface 26 on the rear shell 28 and the center 35 of eye 33 on the valve rod 34 is obtained. Distance x'+m corresponds to distance "x" when the brake booster 10 is attached to fire wall 18 of a vehicle. If distance x'+m is identical to distance "x", as illustrated by that portion of FIG. 1 above the center line of booster 10, a return spring 90 is placed on flange 62 and peripheral surface 74 on the front shell 46 is brought into engagement with bead 72. Thereafter, a lancing operation is performed to create the twist lock arrangement 48 which joins shell 46 to shell 28 to create the unitary structure for brake booster 10. Once bead 72 of diaphragm 70 is retained between peripheral surfaces 74 and 76, wall 42 is prevented from rotating with respect to rear shell 28. Thereafter when wall 42 is moved to the rest position the valve rod extension is fixed.

Figure 2:
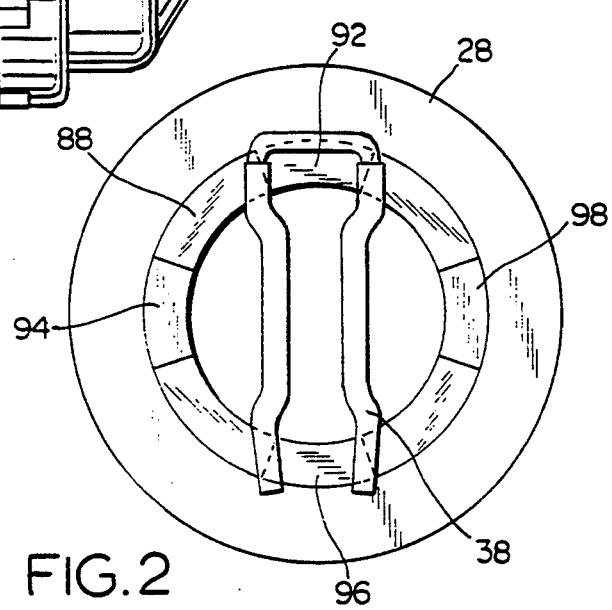
FIG. 2 is a view which illustrates a selected relationship between a key member which retains a control valve in a bore in wall for the brake booster and a ramped surface on the rear shell.
Figure 3:
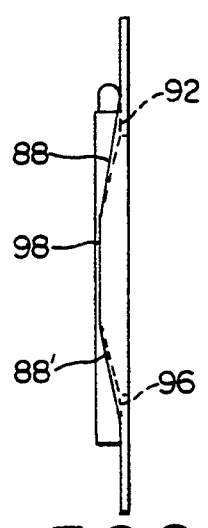
FIG. 3 is a view taken along line 3—3 of FIG. 2 illustrating the ramped surface.

In those instances where distance x'+m is different than a desired distance "x" such as illustrated in that portion of FIG. 1 below the axial center line of booster 10, flange 62 is rotated to move key 38 along ramp 88 to correspondingly linearly move valve body 40 and linkage or valve rod 34. As best shown in FIGS. 2 and 3, ramp 88 is an annular surface which is stamped into the rear shell 28 which uniformly varies from a first base section 92 to a first apex section 94 to a second base section 96 to a second apex section 98 and back to the first base section 92. The first 92 and second 96 base sections are located in a first plane while the first 94 and second 98 apex sections are located in a second plane. Key member 38 engages the ramp 88 such that a substantial uniform force is carried through each point of engagement when return spring 90 moves wall 42 toward the rear shell 28. Key member 38 holds the plunger 44 stationary as valve body 40 continues to move to the rest position where communication through bore 50 from passageways 55 is interrupted.

Figures 4, 5:
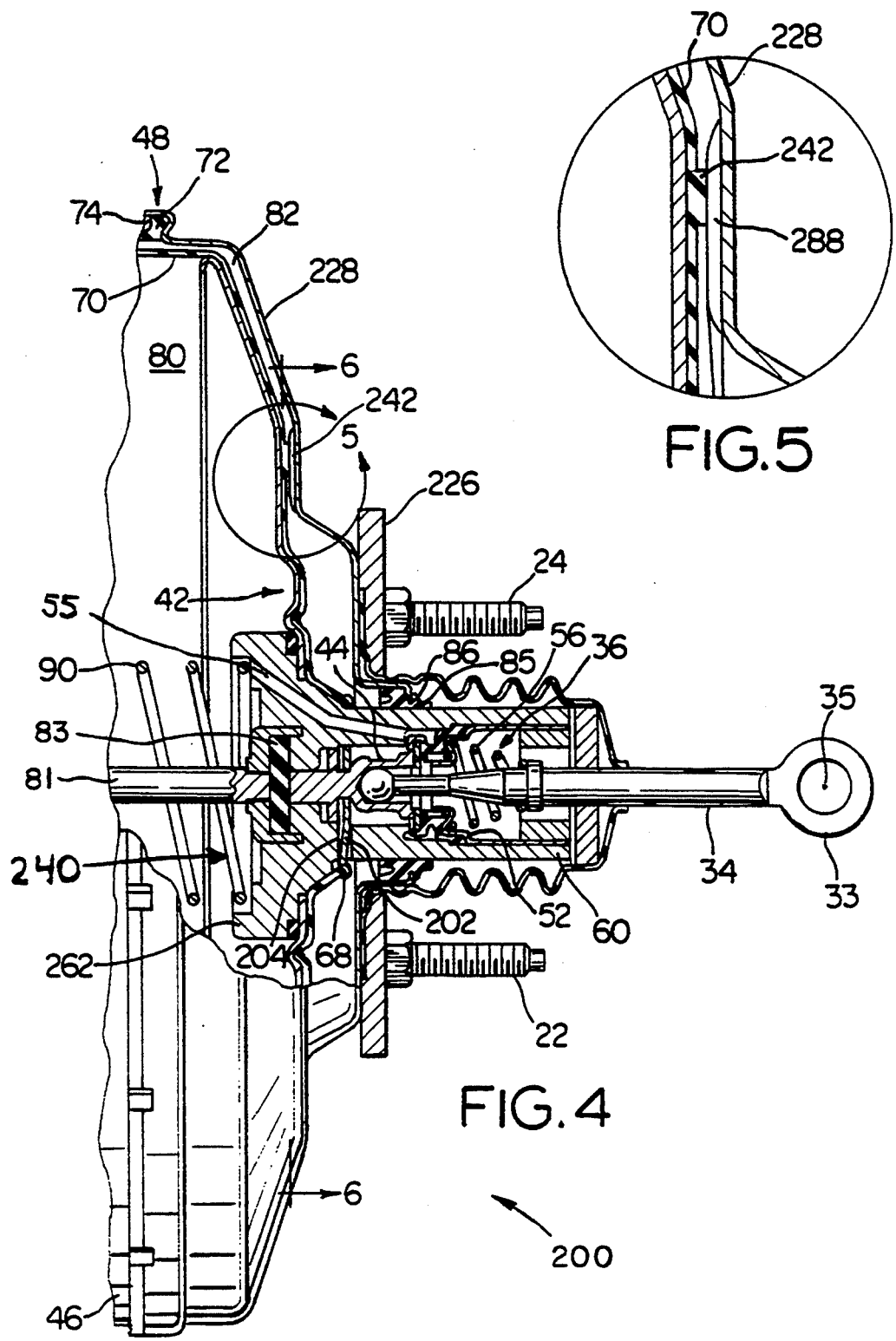
FIG. 4 is a sectional view of a secondary brake booster made according to the principals of the invention wherein projections on the wall are selectively positioned on a ramp in the rear shell to establish the linear extension of the valve rod with respect to the rear shell.
FIG. 5 is an enlarge view of the circumscribes portion 5 of FIG. 4 showing the engagement of a projection with the rear shell.

With distance "x" set for each brake booster 10, when the brake booster 10 is attached to dash panel 18, eye 33 of the linkage member or valve rod 34 is identical and as a result the distance "y" between the floor panel and pad 15 on the brake pedal 14 is set at a desired level. Like components for brake booster 200 illustrated in FIG. 4 are identified with the same number as in FIG. 1. Brake booster 200 is of the type disclosed in U.S. Pat. No. 3,688,647 wherein plunger 44 of control valve 36 is retained in bore 50 by key member 202. Key member 202 is retained in a slot 204 by bead 68 of diaphragm member 70. Return spring 90 acts on flange 62 of valve body 240 to move wall 42 against rear shell 228 to provide a stop when the fluid pressure in chambers 80 and 82 is the same. During the manufacture of brake booster 200, a force is applied to simulate the action of return spring and position projecting tabs 242, 242'. . . $242^N$, located at positions approximately 90° along an annular position on diaphragm 70, are urged against the rear shell 228 in a manner as shown in FIG. 5. The distance x'+m between the peripheral surface 226 on the rear shell 228 and the center 35 of eye 33 on the valve rod 34 is obtained. Distance "x" corresponds to distance between face 226 and pin 30 on brake pedal 12 when brake booster 200 is attached to fire wall 18 of a vehicle. If distance x'+m is identical to distance "x", the force is removed and a return spring 90 is placed on flange 262. Thereafter, peripheral surface 74 on front shell 46 is brought into engagement with bead 72 on diaphragm 70 and a lancing operation is performed to create the twist lock arrangement 48 which joins front shell 46 to rear shell 228 to create the unitary structure for brake booster 200. Once bead 72 is retained between peripheral surfaces 74 and 76, diaphragm 70 holds wall 42 from rotating with respect to rear shell 228. Thus, when wall 42 is in the rest position, the valve rod extension or position of eye 33 is fixed in a location which would provide for a uniform distance y between a brake pad and floor panel for identical model vehicles.

Figure 6:
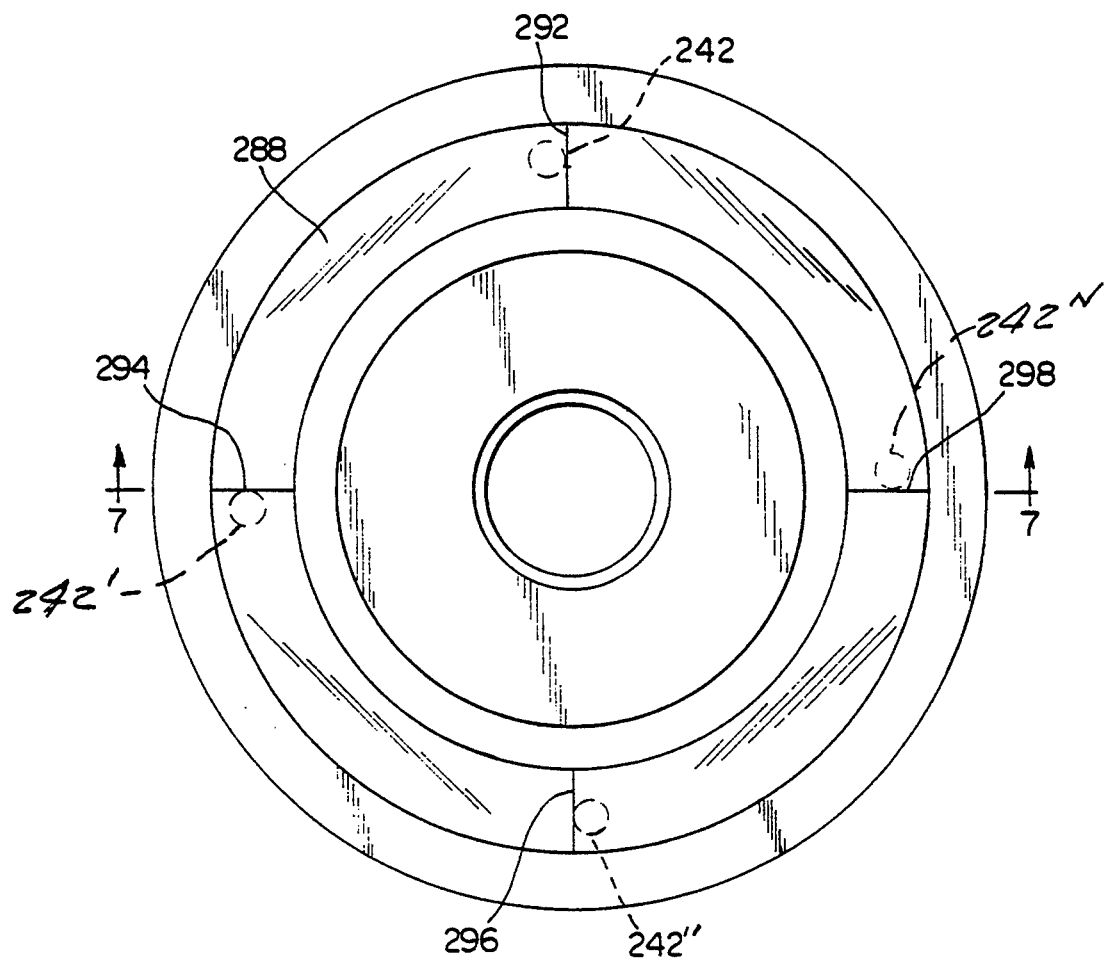
FIG. 6 is a view along line 6—6 of FIG. 4 showing the ramped surface on the rear shell of the brake booster.
Figure 7:
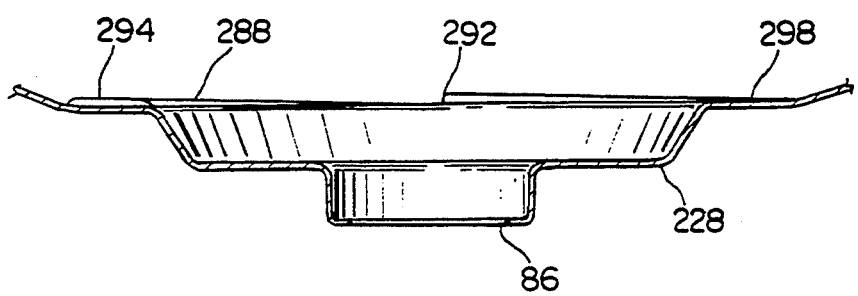
FIG. 7 is a view taken along line 6—6 of FIG. 6 illustrating the ramped surface on the rear shell.

In those instances where distance x'+m is different than a desired distance "x", valve hub 262 is rotated to move projecting tabs 242, 242'. . . $242^N$ along ramp 288 formed in shell 228 to correspondingly linearly move valve body 240 and linkage or valve rod 34. As best shown in FIGS. 6 and 7, ramp 288 is an annular surface which is stamped into the rear shell 228. Ramp 228 uniformly varies from a base section to an apex section 30 for each of the segments 292, 294, 296, 298 corresponding to the selected number of tabs 242, 242'. . . $242^N$d on diaphragm 70. The base sections on shell 228 are located in a first plane while the apex sections are located in a second plane. Projecting tabs 242, 242'. . . $242^N$ engaging the ramp 288 such that a substantial uniform force is carried through each point of engagement when return spring 90 moves wall 42 to the rest position against the rear shell 228.

Distance "x" is set for each brake booster 200 and when the brake booster 200 is attached to dash panel 18, eye 33 of the linkage member or valve rod 34 should be located in an identical position such that distance "y" between the floor panel and pad 15 on the brake pedal 14 is located at a desired level on each vehicle of a particular model.

Through the adjustment of the valve rod extension, the build up of manufacturing tolerances can be substantially nullified such that an operator on driving several different vehicles of the same model equipped with brake booster made according to this invention does not encounter difference in the height of the pad of a brake pedal when applying a input force to a brake booster brake to effect a brake application.

I claim:

1. In a brake booster having a front shell joined to a rear shell to define a housing which is divided into first and second chambers by a wall, said wall having a bore therein for retaining a control valve, said control valve being connected to a brake pedal in a vehicle through a linkage member, said linkage member responding to an input force by moving the control valve from a rest position to an actuation position to develop an output force through the creation of a pressure differential across the wall, the improvement comprising:

stop means on said rear shell having an annular surface which uniformly varies from a first base section to a first apex section to a second base section to a second apex section and back to said first base section, said first and second base sections being located in a first plane while said first and second apex sections are located in a second plane, said wall engaging corresponding locations on said annular surface for establishing a desired fixed linear distance between a peripheral surface on said rear shell and an eye in said linkage member which is joined to said brake pedal, said fixed linear distance establishing a corresponding fixed distance between the brake pedal and a floor panel in the vehicle when the control valve is in the rest position.

2. In the brake booster as recited in claim 1 wherein further including:

key means for holding said control valve in said bore, said key means engaging said rear shell to position said valve in the rest position.

3. In a brake booster having a front shell joined to a rear shell to define a housing which is divided into first and second chambers by a wall, said wall having a bore therein for retaining a control valve, said control valve being connected to a brake pedal in a vehicle through a linkage member, said linkage member responding to an input force by moving the control valve from a rest position to an actuation position to develop an output force through the creation of a pressure differential across the wall, the improvement comprising:

stop means on said rear shell having an annular surface which uniformly varies from a plurality of base sections to a plurality of apex sections, said base sections being located in a first plane while said apex sections are located in a second plane, said wall having a plurality of projections that engage corresponding locations on said annular surface to define said fixed linear distance between a peripheral surface on said rear shell and an eye in said linkage member which is joined to said brake pedal, said fixed linear distance establishing a corresponding fixed distance between the brake pedal and a floor panel in the vehicle when the control valve is in the rest position.

* * * * *